March 5, 1929.  H. HUGHES, JR., ET AL  1,704,435
BRAKE EQUALIZER
Filed Nov. 8, 1926  2 Sheets-Sheet 1

INVENTORS
HUGH HUGHES, JR.
JOHN HUGHES
WILLIAM HUGHES
BY

ATTORNEYS

INVENTORS
HUGH HUGHES, JR.
JOHN HUGHES
WILLIAM HUGHES
BY
ATTORNEYS

Patented Mar. 5, 1929.

1,704,435

UNITED STATES PATENT OFFICE.

HUGH HUGHES, JR., JOHN HUGHES, AND WILLIAM HUGHES, OF DETROIT, MICHIGAN.

BRAKE EQUALIZER.

Application filed November 8, 1926. Serial No. 146,877.

Our invention aims to provide a brake equalizer for vehicles having two or more wheels provided with brakes. An instance of such a vehicle is an automobile having a rear axle assembly including ground engaging wheels provided with brake bands or shoes and drums, with the bands or shoes arranged to be retracted up or distended against the brake drums. An operating mechanism extends forwardly from the rear axle assembly to the driver's seat of the automobile so that the brakes can be controlled and this operating mechanism ordinarily includes rock shafts, reach and connecting rods and such other connecting elements by which the brakes of the wheels may be simultaneously applied or released. The operating mechanism is often times defective to the extent that the operation of one brake will be in advance or lag behind the operation of the other brake, and it is to rectify this condition that we have devised a novel form of equalizer by which actuation of the brakes is synchronized, thus assuring more positive and reliable control of a vehicle.

Briefly described, our brake mechanism includes rockable members articulated with the brakes of a rear axle assembly. Pivoted bell cranks are operatively connected to the rockable members, and a belt or lever actuated cam head is interposed between the bell crank to actuate the same and cause application of the brakes or release of the same in synchronism.

Our invention will be hereinafter specifically described and then claimed, and reference will now be had to the drawings, wherein Figure 1 is a plan of a portion of a vehicle chassis provided with a brake mechanism in accordance with our invention;

Fig. 2 is a perspective view of the main part of the brake mechanism;

Figure 3:
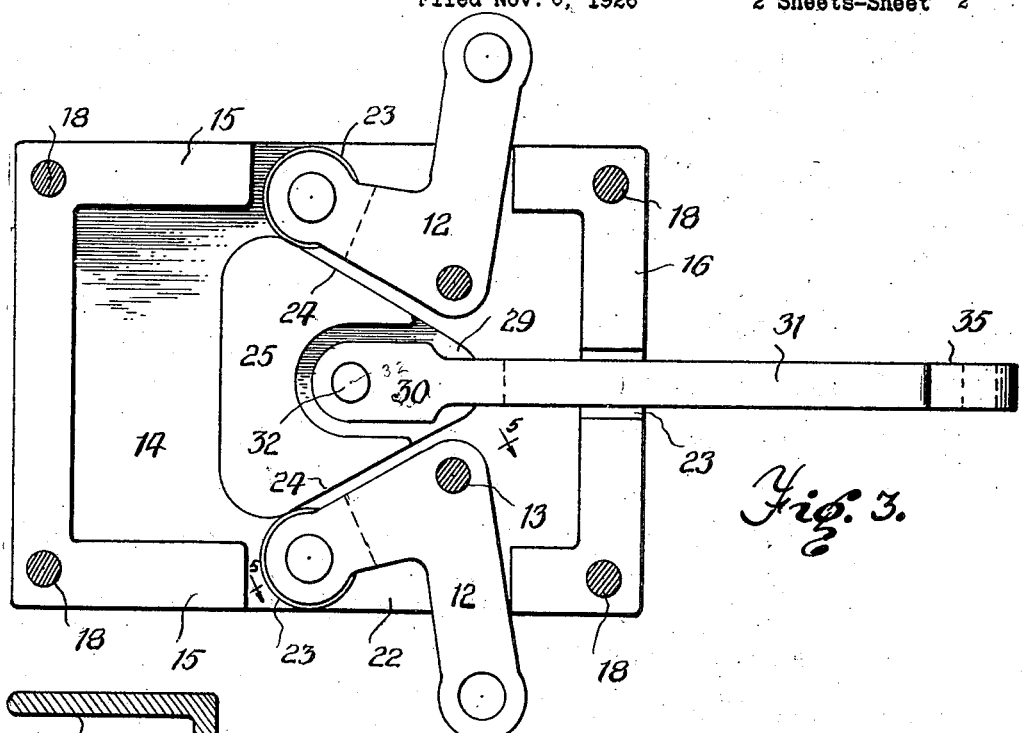
Fig. 3 is a bottom plan of a housing with a portion of the mechanism therein.

Reference will first be had to Fig. 1 showing automobile chassis frames 1 supported by a suitable spring suspension 2 from a rear axle assembly 3, which includes ground engaging wheels 4 and brakes 5 for said wheels. These brakes may be of that type including bands contractible to brake drums or bands or shoes adapted to be distended against the inner walls of brake drums, therefore we prefer to consider the wheel brakes as being of a conventional form with our invention not limited to any specific type of brake.

Figures 4, 5:
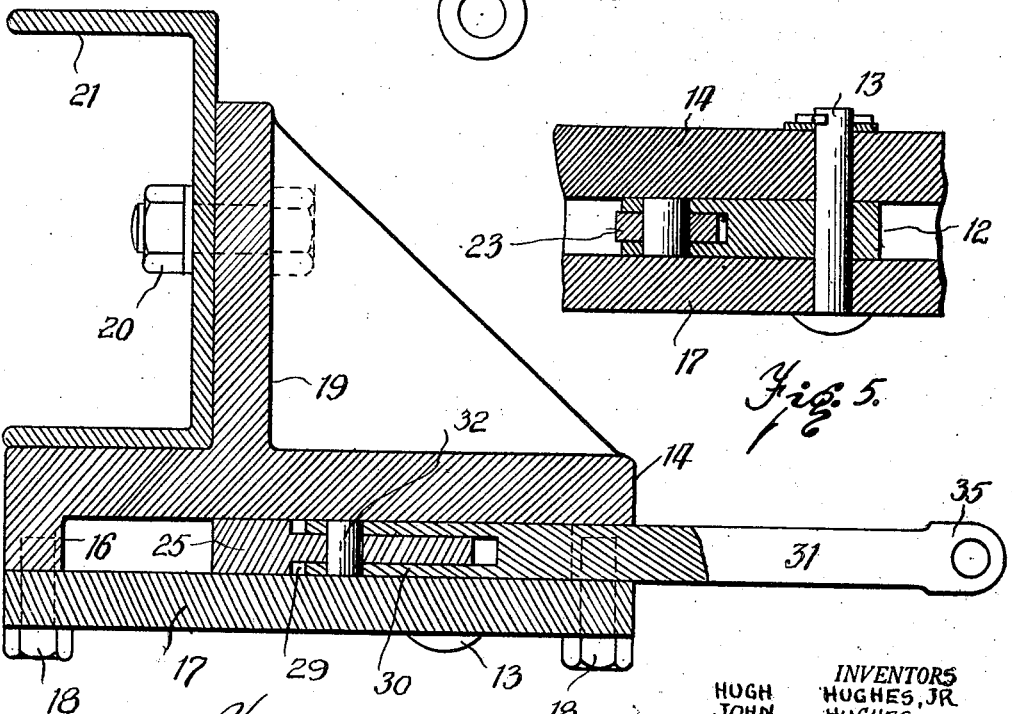
Fig. 4 is a longitudinal sectional view of the same.
Fig. 5 is an enlarged detail sectional view of the pivotal mounting of a bell crank taken on the line 5—5 of Fig. 3.

The brakes 5 are adapted to be controlled by reach rods 6 extending forwardly and connected to the outer cranks 7 of rockable members or shafts 8 which extend transversely of the chassis frames and may be supported in suitable bearings 9. The rockable members 8 have inner cracks 10 operatively connected by rods 11 to horizontally disposed bell cranks 12 pivotally mounted, as at 13, in a housing 14. The housing 14 is substantially rectangular in bottom plan and has side walls 15 and end walls 16 to which a bottom cover plate 17 is connected by a plurality of screw bolts 18 or other fastening means. The top of the housing 14 has a bracket formation 19 so that it may be firmly secured, as at 20, to a transverse frame member 21 of the chassis. See Figs. 1 and 4. This housing is preferably located in the central longitudinal axis of the chassis, intermediate the ends of the transverse member 21, and the rockable members 8 are positioned so that the inner cracks 10 of these rockable members will be in substantial longitudinal alinement with the outer ends of the bell cranks 12, which protrude through openings 22 in the side walls 15 of the housing 14. The inner ends of the bell cranks 12 are provided with antifrictional rollers 23 normally engaging the converging side walls or cam surfaces 24 of an equalizing head or cam member 25 which is substantially triangular in plan and slidably arranged between the top and bottom walls of the housing 14. To maintain the roller 23 normally in engagement with the cam member 25 coiled retractile springs 26 are employed. These springs connect brackets 27 of the chassis to extensions 28 of the outer cranks 7. See Figs. 1 and 2. The springs 26 may be operatively associated with the reach rods 6 or any other arrangement may be resorted to by which the bell crank 12 will be normally retained in engagement with the cam member 25.

The upper and lower faces of the cam member 25 are recessed, as at 29 to accommodate the bifurcated end 30 of a link 31 to the cam member and the front end wall 16 of the housing is cut away, as at 33 to permit of the link extending forwardly. A brake rod 34 may be operatively connected to an eye end 35 of the link 31 and said brake rod is adapted to be controlled by a pedal or lever which we have deemed unnecessary to illustrate on account of being conventional and forming part of various types of automobiles.

With the bell cranks 12 pivotally mounted in the fixed housing 14 and the cam member 25 slidably mounted in said housing, said cam member may readily adjust itself relative to the bell cranks and thus serve as an equalizing element to insure an equal amount of movement or actuation of the rockable members 8 and the connections to the brakes 5. As shown in Fig. 3, the bell cranks 12 have been actuated and the brakes applied so the pressure of the bell cranks against the cam member 25 tends to squeeze or force the same rearwardly, there being clearance in the housing 14 for such rearward movement when the brakes are to be released. Pulling the cam member 25 between the anti-frictional rollers 23 of the bell cranks 12 insures a positive movement of these bell cranks, yet permits of such movement being synchronous for a uniform application of the vehicle brakes.

It is thought that the operation and utility of the brake mechanism will be apparent without further description, and while in the drawings there is illustrated a preferred embodiment of our invention, it is to be understood that the structural elements are susceptible to such variations and modifications as fall within the scope of the appended claims.

What we claim is:—

1. In a brake mechanism for vehicles wherein rockable members are adapted to be actuated by a brake rod to apply brakes; an equalizer interposed between said members and rod, said equalizer comprising a set of bell cranks operatively connected to said rockable members, and a cam head between said bell cranks connected to said brake rod and adapted to actuate said bell cranks to cause application of the brakes.

2. A brake mechanism as called for in claim 1, and a housing supporting said bell cranks and said cam head.

3. A brake mechanism as called for in claim 1, wherein said cam head is triangular in plan, and said bell cranks have anti-frictional rollers engaging converging side walls of said head.

4. In a vehicle wherein an axle assembly has wheel brakes with reach rods adapted to apply said brakes, and wherein a brake rod is adapted to actuate said reach rods;—an equalizing mechanism comprising transversely alining independent rockable crank members connected to said reach rods, horizontally disposed bell cranks connected to said rockable crank member and disposed in opposed relation, a link extending between said bell cranks and connected to said brake rod, and a head on said link adapted to be drawn between said bell cranks to effect rocking of said crank members and application of said brakes.

5. A vehicle brake mechanism as called for in claim 4, and a housing supported by said vehicle and supporting said bell cranks and said head.

In testimony whereof we affix our signatures.

HUGH HUGHES, Jr.
JOHN HUGHES.
WILLIAM HUGHES.